United States Patent
Hiwada et al.

(10) Patent No.: US 6,762,764 B2
(45) Date of Patent: Jul. 13, 2004

(54) SYSTEM AND METHOD FOR PROCESSING IMAGE, AND COMPILER FOR USE IN THIS SYSTEM

(75) Inventors: Kazuhiro Hiwada, Yokohama (JP); Takahiro Saito, Yokohama (JP); Seiichiro Saito, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 10/125,484

(22) Filed: Apr. 19, 2002

(65) Prior Publication Data

US 2003/0137518 A1 Jul. 24, 2003

(30) Foreign Application Priority Data

Jan. 22, 2002 (JP) .................................. 2002-013001

(51) Int. Cl.$^7$ .............................................. G06T 01/20
(52) U.S. Cl. ................................. 345/506; 345/561
(58) Field of Search ................................ 345/501, 502, 345/503, 505, 506, 530, 520, 519, 559, 561; 709/100, 102, 103, 104

(56) References Cited

U.S. PATENT DOCUMENTS 6,647,150 B2 * 11/2003 van der Wal ............... 382/260

OTHER PUBLICATIONS

"Nvidia nfiniteFX Engine: Programmable Pixel Shaders", Technical Brief, Nvidia Corporation, pp.1–4.

* cited by examiner

Primary Examiner—Kee M. Tung
(74) Attorney, Agent, or Firm—Oblon, Spivak, McClelland, Maier & Neustadt, P.C.

(57) ABSTRACT

An image processing system comprises: a plurality of operation pipelines to operate an inputted image data; a switching channel to switch a data transfer path to input operation results, which are outputted from the plurality of operation pipelines, to the plurality of operation pipeline again; and a control circuit to control switching of the data transfer path by the switching channel and to control an operation in the plurality of operation pipelines, the control circuit carrying out a scheduling of a plurality of operations, which form (n−k+1) unit operations from a unit operation k (1<k<n) to a unit operation n (n is a positive integer) of unit operations 1 to n, the plurality of operations prevented from overlapping with each other at the same predetermined operation time in the same operation pipeline when a unit operation included in the plurality of operations is executed by the plurality of operation pipelines.

20 Claims, 9 Drawing Sheets

|  | FUa | FUb |
|---|---|---|
| CLOCK 0 | $a0_k$ | |
| CLOCK 1 | $a1_k$  $a0_{k+1}$ | $b0_k$ |
| CLOCK 2 | $a2_k$  $a1_{k+1}$ | $b0_{k+1}$ |
| CLOCK 3 | $a2_{k+1}$ | $b2_k$ |
| CLOCK 4 | | $b2_{k+1}$ |

(a) EXAMPLE 1 WHERE SCHEDULING OVERLAPS

|  | FUa | FUb |
|---|---|---|
| CLOCK 0 | $a0_k$ | |
| CLOCK 1 | | $b0_k$ |
| CLOCK 2 | $a1_k$ | |
| CLOCK 3 | $a0_{k+1}$ | |
| CLOCK 4 | $a2_k$ | $b2_k$  $b0_{k+1}$ |
| CLOCK 5 | $a1_{k+1}$ | |
| CLOCK 6 | $a0_{k+2}$ | |
| CLOCK 7 | $a2_{k+1}$ | $b2_{k+1}$  $b0_{k+2}$ |
| CLOCK 8 | $a1_{k+2}$ | |

(b) EXAMPLE 2 WHERE SCHEDULING OVERLAPS

FIG.6

CHANNEL IN FU IS REALIZED BY TEMPORAL CHANNEL (FIFO)

SYSTEM AND METHOD FOR PROCESSING IMAGE, AND COMPILER FOR USE IN THIS SYSTEM

CROSS REFERENCE TO RELATED APPLICATION

This application is based upon and claims the benefit of priority from the prior Japanese Patent Application No. 2002-013001, filed on Jan. 22, 2002, the entire contents of which are incorporated herein by reference.

BACKGROUND

This invention relates to a system and method for processing an image and a compiler for use in this application, and particularly relates to a system and method capable of carrying out rapid data processing by reducing the number of loading/storing operations when processing a large amount of image data, and a compiler for use in this system.

In general, in the field of image processing technique, such as computer graphics, it is desired to provide an image processing system having a flexible image processing function in order to realize various expressions relating to shape, color and so forth in an image. Also with respect to a compiler serving as software for use in this image processing system, it is desired to provide a compiler capable of processing a large amount of data relating to shape, color and so forth in a colorful image.

For example, in a case where color is determined on the basis of a texture showing a pattern by brightness and color in an image, the color of the image is determined on the basis of coordinates of pixels forming the image. Also during this processing for determining color, a large amount of data must be used to be sequentially operated. For that reason, image processing systems (Graphic Processor Units (GPUs)) for carrying out rapid operation are conventionally used.

However, in conventional GPUs, it is possible to deal with only fixed data flows or semi-fixed data flows, and the processing of pixels capable of being executed at a time (by one path. For that reason, it is required to use a plurality of paths of GPUs in order to carry out a complicated operation. In a case where a plurality of paths of GPUs are used, after intermediate data is temporarily written in a memory, such as a frame buffer, in the last path, data written in the memory, such as the frame buffer, is read out of the memory in the subsequent path, so that the number of loading/storing operations increases with respect to the memory.

There is a problem in that the increase of the number of loading/storing operations with respect to the memory causes a bottle neck for the flow of data processing in the whole image processor to reduce image processing performance, so that improvements are desired from the standpoint of rapid data processing. For example, the GeForce 3 GPU produced by "nVidia Company" has a programmable pixel processor, and is capable of programming an address operator and a combiner for blending pixel color and so forth, by a series of instruction strings, respectively (See Paper: GeForce 3 GPU [Compiling to a VLIW Fragment Pipeline: FIGS. 1, 2]).

However, also in the chip produced by nVidia Company disclosed in the above described paper, the number of instructions capable of being executed with respect to one pixel at a time is limited, and the number of registers is also limited. Therefore, it is required to use a plurality of paths of pixel processors to carry out a more complicated processing. The reason for this is that the address operator is separated from the combiner in the image processor serving as the prior art, so that it is required to separate into a plurality of paths when it is intended to carry out operation in order from the combiner to the address operator.

If it is possible to provide an image processing system for carrying out a more flexible processing by one path and a compiler for use therein, it is possible to reduce the number of paths in a pixel operation, and it is possible to reduce the number of loading/storing operation in memory which tends to be a bottle neck for performance.

SUMMARY OF THE INVENTION

An image processing system according to a first aspect of the present invention comprises: a plurality of operation pipelines to operate an inputted image data; a switching channel to switch a data transfer path to input operation results, which are outputted from the plurality of operation pipelines, to the plurality of operation pipeline again; and a control circuit to control switching of the data transfer path by the switching channel and to control an operation in the plurality of operation pipelines, the control circuit carrying out a scheduling of a plurality of operations, which form (n−k+1) unit operations from a unit operation k (1<k<n) to a unit operation n (n is a positive integer) of unit operations 1 to n, the plurality of operations prevented from overlapping with each other at the same predetermined operation time in the same operation pipeline when a unit operation included in the plurality of operations is executed by the plurality of operation pipelines.

A compiler according to a second aspect of the present invention for use in an image processing system having a plurality of operation pipelines to operate an inputted image data; a switching channel to switch a data transfer path to input operation results, which are outputted from the plurality of operation pipelines, to the plurality of operation pipeline again; and a control circuit to control the switching of the data transfer path by the switching channel and to control an operation in the plurality of operation pipelines, the compiler comprising receiving a part of the image data supplied from the outside each operation pipeline included in the plurality of operation pipelines, and scheduling a plurality of operations, which form (n−k+1) unit operations from a unit operation k (1<k<n) to a unit operation n (n is a positive integer) of n unit operations from 1 to n forming the plurality of operations, the plurality of operations prevented from overlapping with each other at the same operation time in the same operation pipeline, and controlling a sequence of operations in the plurality of operation pipelines in accordance with scheduling.

An image processing method according to a third aspect of the present invention comprises: supplying a part of inputted image data, which is supplied from the outside, to each operation pipeline forming a plurality of operation pipelines to operate the image data; carrying out a scheduling of a plurality of operations, which form (n−k+1) unit operations from a unit operation k (1<k<n) to a unit operation n (n is a positive integer) of n unit operations from 1 to n forming the plurality of operations, the plurality of operations prevented from overlapping with each other at the same operation time in the same operation pipeline; and controlling the operation of the image data in accordance with the scheduling.

BRIEF DESCRIPTION OF THE DRAWINGS

In the drawings:

FIG. 6 is an illustration showing (a) Example 1 shifted by one cycle and (b) Example 2 shifted by three cycles, in which scheduling can not be carried out due to the overlapping of operations;

FIG. 12 is an illustration showing a channel an operation pipeline when a channel in an FU is realized by a FIFO or the like;

DESCRIPTION OF THE EMBODIMENTS

Referring now to the accompanying drawings, the embodiments of a system and method for processing an image and a compiler for use in this system according to the present invention will be described below. First, referring to FIG. 1, the whole system configuration of the first embodiment of an image processor will be described. It is an object of the construction in this first embodiment to provide an image processor for efficiently carrying out various image processes. First, an example of a configuration of a system using a processor in the first embodiment will be described.

Figure 1:
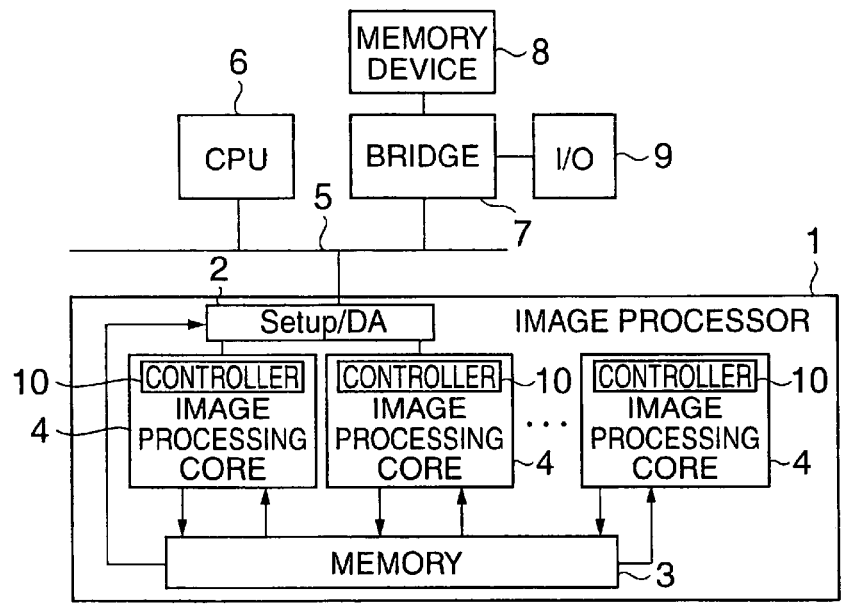
FIG. 1 is a block diagram showing the whole configuration of an image processing system according to a first embodiment of the present invention is provided.

FIG. 1 shows an example of a configuration of an image processing system to which the first embodiment of an image processor according to the present invention is applied. In this figure, an image processor 1 comprises an image processing dedicated circuit 2, such as a Setup/DDA, a memory 3 mounted on the same chip, and at least one, preferably a plurality of image processing cores 4. The detailed construction of the image processing core 4 will be described later.

The image processor 1 is connected to a central processing unit (which will be hereinafter referred to as a CPU) via a system bus 5, and is associated with the CPU 6 to carry out information processing including an image processing. The image processor 1 is also connected to an external memory unit 8 via the system bus 5 and a bridge 7, and carries out an information processing while transmitting and receiving data to and from the memory unit 8. To the bridge 7, an input/output part 9 is also connected. Each of the image processing cores 4 includes a controller 10 which controls components in each core.

Figure 2:
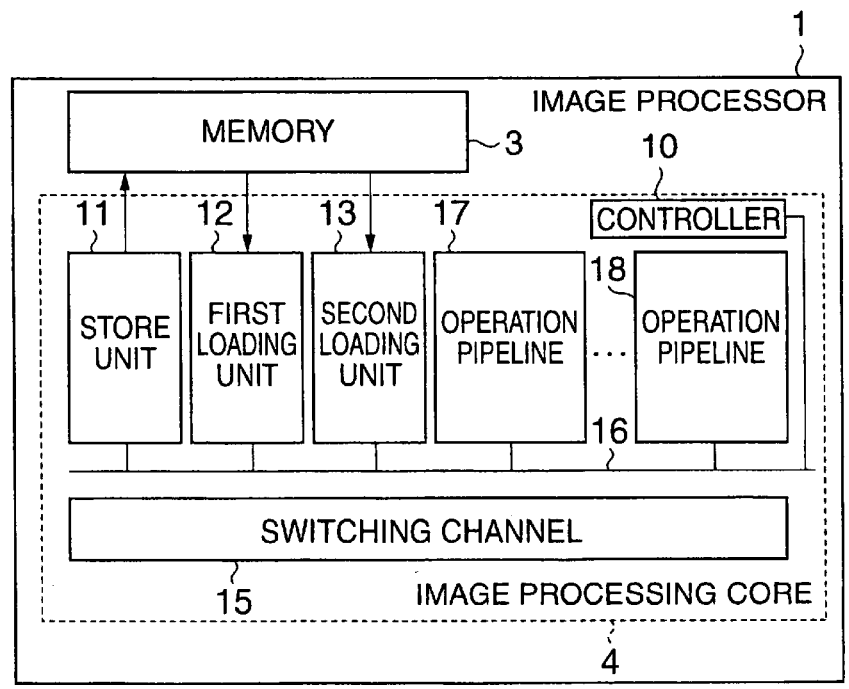
FIG. 2 is a block diagram showing a schematic construction of an image processing core in FIG. 1.

Referring to FIG. 2, the details of the image processing core 4 will be described below. FIG. 2 schematically shows the image processing core 4. The image processing core 4 comprises, in addition to the above described controller 10, a first loading unit 12, a plurality of operation pipelines 17 and 18 which are pipeline-like operators to carry out a pixel operation, a switching channel 15, and an internal bus 16 which functions as a communication path. The controller 10 carries out a scheduling so as to prevent a plurality of operations, which constitute (n−k+1) unit operations from a unit operation k (1<k<n) to a unit operation n (n is a positive integer) of n unit operations from 1 to n, from overlapping with each other at the same operation time in the same operation pipeline when the plurality of operation pipelines 17 and 18 execute an unit operation including a plurality of operations in the pipelines (the details will be described later).

The image processing core 4 receives at least a part of image data from the memory 3 via the first loading unit 12 to process the data by each of the operation pipelines 17 and 18 of an operation pipeline group to rewrite a series of data in the memory 3 via the store unit 11 to carry out an information processing. At this time, the switching channel 15 and the internal bus 16 are used for executing a program having a DAG (Directed Acyclic Graph)-like data flow. A method for executing this program will be described later.

By enabling the execution of the program having the DAG-like data flow, the number of loading/storing operations in the memory can be reduced in comparison with conventional GPUs capable of executing only a fixed data flow. In order to realize this, although the amount of hardware slightly increases by the addition of the switching channel 15 and the internal bus 16, the number of loading/storing operations tending to be a bottle neck on performance can be reduced, so that the improvement of the whole performance can be expected.

Figure 3:
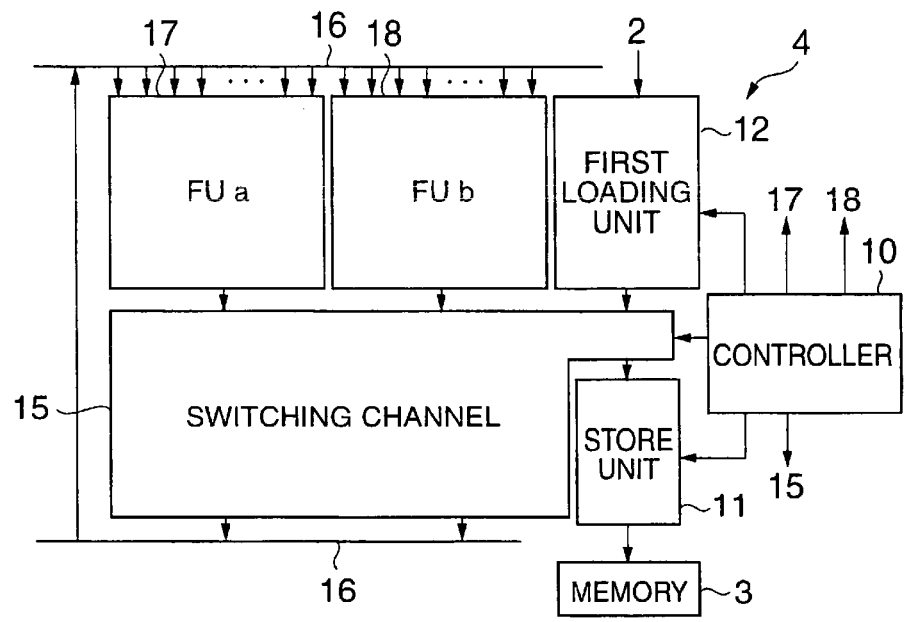
FIG. 3 is a block diagram showing a schematic functional construction in an image core.

Referring to FIG. 3, an example of a functional construction of an image processing core 4 will be described below.

FIG. 3 is a block diagram showing an example of a construction of an image processing core 4. In the case of the image processor in this first embodiment, the image processing core 4 comprises a controller 10, a storing unit 11, a first loading unit 12, a switching channel 15, an internal bus 16, a first operation pipeline (FUa) 17, and a second operation pipeline (FUb) 18.

The controller 10 controls other components every step by particularly using a concept called phase. The phase is herein defined by Phase=Step Number mod Maximum Phase Number. Since the phase can be grasped as an operation clock in a concrete operation stage in the operation pipelines 17 and 18, the phase will be expressed as a clock in the subsequent explanation.

Figure 4:
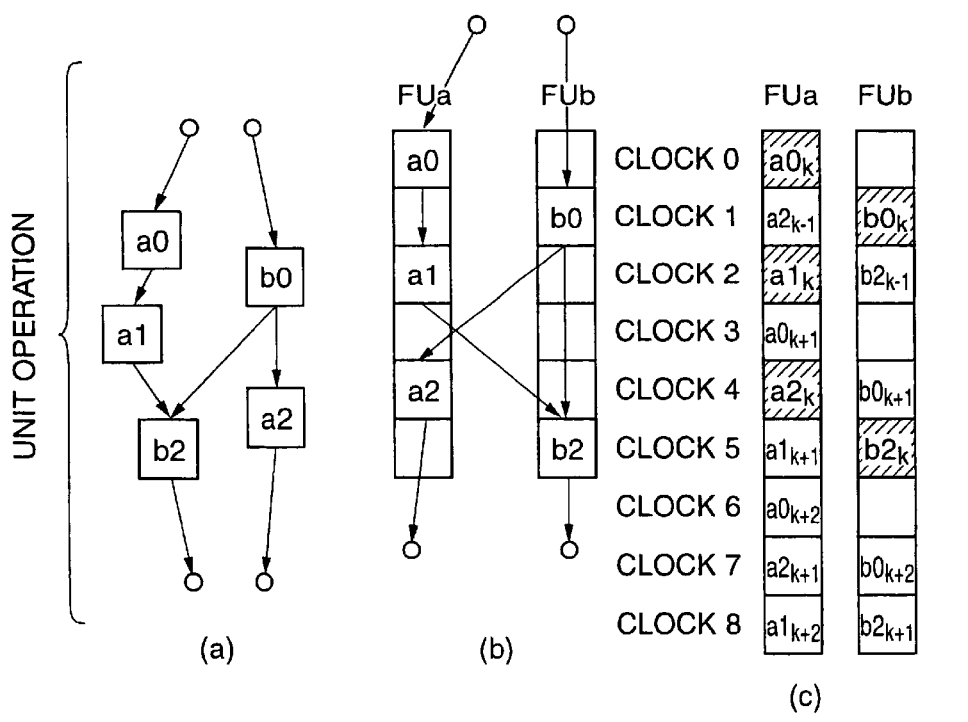
FIG. 4 is an illustration for explaining the operation of the image processing core in FIGS. 1 through 3, wherein (a) shows a data flow graph (DFG=unit operation), (b) shows a unit operation scheduled by two functional units (FUs), and (c) shows the schedule of two FUs.

The FUa 17 and FUb 18 are pipelined operation pipeline, and can execute different instructions every a predetermined operation time, i.e., every phase (clock in FIG. 4). The switching channel can comprise a group of channels and cross bars. These cross bars are single direction cross bars capable of carrying out a multicast (an input set does not overlap with an output set). The cross bar can feed the output of the operation pipeline to an optional channel every clock, and can feed the output of an optional channel to the input of an optional operation pipeline every clock. The switching channel 15 is formed by putting a plurality of channels (IR/IW RAM) together. Each channel of the switching channel 15 can read on the basis of a read offset address determined every clock, and write on the basis of a write offset address.

With such a construction, it has a higher programmability than that of a register combiner type GPU, such as the GeForce 3, and can control a larger number of operators with a more area efficiency than those of a VLIW type processor.

The compiler for use in the second embodiment of an image processing system according to the present invention is an image processing program executed in the image processor 1. This compiler carries out a scheduling so that each of operation pipelines forming a plurality of operation pipelines receives part of the image data, which is supplied from the outside, to prevent a plurality of operations, which are (n−k+1) unit operations from a unit operation k (1<k<n) to a unit operation n (n is a positive integer) of n unit operations from 1 to n, from overlapping with each other at the same operation time in the same operation pipeline, and control the sequence of operation in the plurality of operation pipeline in accordance with the scheduling.

Referring to FIG. 4, an example of execution of a program in the image processor in the first embodiment will be described below. FIG. 4 shows an example of a program capable of being executed by the image processing core 4, and its schedule. FIG. 4(a) shows a DFG (Data Flow Graph) to be executed. This DFG constitutes a unit operation serving as a repeated pattern for a series of operations. That is, in the figure, reference sign a0, a1, a2, b0 and b2 correspond to the respective operations in the operation pipeline (FU), and a set of a series of operations a0, a1, a2, b0 and b2 is a unit operation, arrows connecting the respective operations in the unit operation corresponding to transfer between operation pipelines, upper white circles in the figure meaning inputs, and lower white circles in the figure meaning outputs.

FIG. 4(b) shows a unit operation after scheduling. It is assumed that a0, a1 and a2 can be executed by the first operation pipeline (FUa) 17 and b0 and b2 can be executed by the second operation pipeline (FUb) 18. The FUa 17 and FUb 18 can execute different instructions every clock. In this example, the FUa 17 executes the operation a0 at clock 0, and the operation a2 at clock 4. The FUb executes b0 at clock 1, and the operation b2 at clock 5. The maximum clock is 3, and one operation pipeline FU is set so as to be capable of executing one operation during three clocks.

FIG. 4(b) notes one unit operation based on a set of input data. A series of processes in one unit operation is called generation. A set of input data which is different every step is inputted during execution, and a plurality of generations of processes are simultaneously executed. FIG. 4(c) shows the state of the processing. In this figure, a plurality of operations with slant lines are unit operations of the same generation k.

In FIG. 4(c), the operations of the k-th generation of the unit operation are carried out at the same clock. The FUa 17 executes an operation $a0_k$ at clock 0, $a1_k$ at clock 2, and an operation $a2_k$ at clock 4. The FUb executes $b0_k$ at clock 1, and an operation $b2_k$ at clock 5. With respect to the unit operation of the next generation k+1, the FUa 17 executes an operation $a0_{k+1}$ at clock 3, $a1_{k+1}$ at clock 5, and an operation $a2_{k+1}$ at clock 7, and the FUb executes $b0_{k+1}$ at clock 4 and an operation $b2_{k+1}$ at clock 8.

Figure 5:
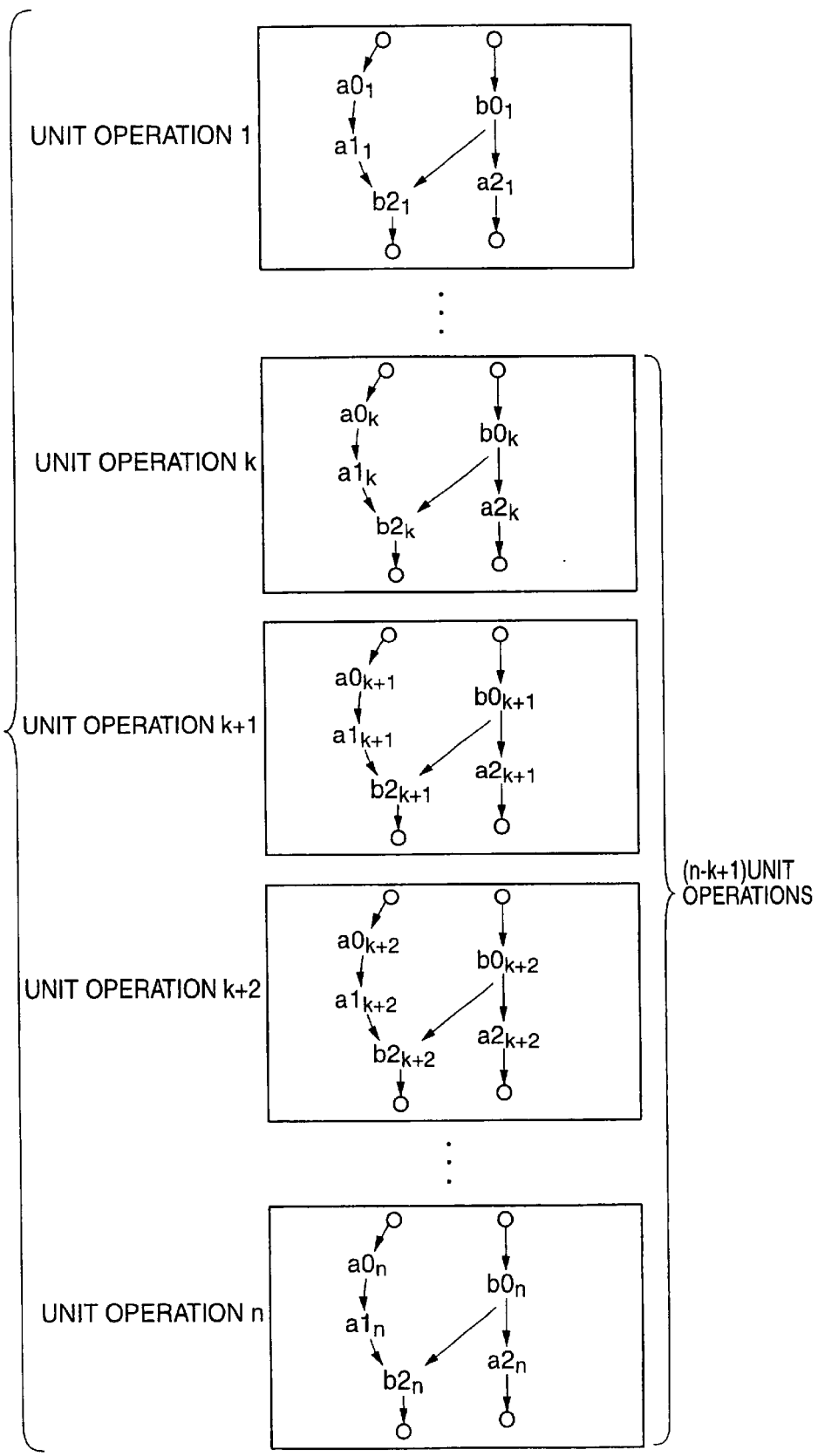
FIG. 5 is an illustration showing the relationship between unit operations 1 to n and each operation.

Referring to FIG. 5, the relationship between unit operations and respective operations. The image processor sequentially processes n unit operations from a unit operation 1 to a unit operation n, and the sequence of the respective operations in each unit operation is the same sequence. Therefore, the processes in a plurality of operation pipelines must schedule so as to prevent the respective operations in the same unit operation overlap with each other at the same clock and so as to prevent operations in the adjacent unit operations and unit operations at some intervals from overlapping from each other at the same clock in the same pipeline.

That is, when the respective operation pipelines 17 and 18 constituting a group of operation pipelines receive part of a series of data which are fed from the outside to be held in the memory and when the controller 10 schedule so as to use the plurality of pipelines 17 and 18 to operate a unit operation comprising a plurality of operations during the plurality of operation times, if the unit operations are unit operations 1 to n (n is a positive integer), the controller 10 controls the sequence of operations so as to prevent each operation in the k-th (1<k<n) unit operation from overlapping with each other and each operation in the k+1-th and k+2-th unit operations from overlapping with each other at the same operation time in the same pipeline and so as to prevent each operation in the (n−k+1) unit operations from k to n from overlapping with each other at the same operation time (clock) in the same pipeline 17 or 18.

FIG. 6(a) shows an example 1 where scheduling overlaps if being shifted by one cycle, and FIG. 6(b) shows an example 2 where scheduling overlaps if being shifted by three cycles. In the example 1 shown in FIG. 6(a), there is shown a case where unit operations are executed so that $a0_k$ is executed at clock 0, $a1_k$ is executed at clock 1, $a2_k$ is executed at clock 2, ..., although the sequence of operations in the unit operation is the same as that in FIG. 4(a). As shown in FIG. 4(b), if scheduling is not carried out so that the FUa operates at clocks 0, 2 and 4 and does not operate at clocks 1 and 3 therebetween and if the respective pipelines are used at continuous clocks for carrying out a parallel operation, the respective operations in the unit operation k are carried out so that the FUa carries out the operation $a0_k$ at clock 0, the operation $a1_k$ at clock 1 and the operation $a2_k$ at clock 2 and the FUb carries out the operation $b0_k$ at clock 1 and the operation $b2_k$ at clock 3. Then, if scheduling is carried out a clock shifted by one cycle to carry out the unit operation k+1 in the next generation, scheduling is carried out so that the FUa operates $a0_{k+1}$ at clock 1, $a1_{k+1}$ at clock 2 and $a2_{k+1}$ at clock 3 and the FUb operates $b0_{k+1}$ at clock 2 and $b2_{k+1}$ at clock. In this case, as shown in blocks with slant lines in FIG. 6(a), two operations in different generations are scheduled at clocks 1 and 2 in the FUa, so that the operations overlap with each other at a specific clock in the FUa.

FIG. 6(b) shows a case where the next unit operation is shifted by three cycles after the same unit operation as that in FIG. 4(a) is scheduled in the same manner as that in FIG. 4(c). In this case, although the unit operation k is carried out by the same scheduling as that in FIG. 4(c), the unit operation k+1 in the next generation is carried out so as to operate $a0_{k+1}$ at clock 3, $a1_{k+1}$ at clock 5 and $a2_{k+1}$ at clock 7 in the FUa and so as to operate $b0_{k+1}$ at clock 4 and $b2_{k+1}$ at clock 7 in the FUb. Therefore, as shown in blocks with slant lines in FIG. 6(b), the operations $b2_k$ and $b0_{k+1}$ overlap with each other at clock 4 in the FUb. Also at clock 7 in the FUb, the operations $b2_{k+1}$ and $b0_{k+1}$ overlap with each other. In order to avoid such overlapping of operations, it may be studied whether the respective operations collide with each other with respect to the unit operation as described in FIG. 5, and scheduling shown in FIG. 4(c) may be carried out.

By thus operating the operation pipeline after previously scheduling, it is possible to efficiently execute the operations of the plurality of operation pipelines every clock without wasting, so that it is possible to simply carry out efficient control of operators and communication paths. Furthermore, since instructions to be executed by clocks in each operation pipeline have been determined, corresponding instructions may be sequentially executed every clock.

Figure 7:
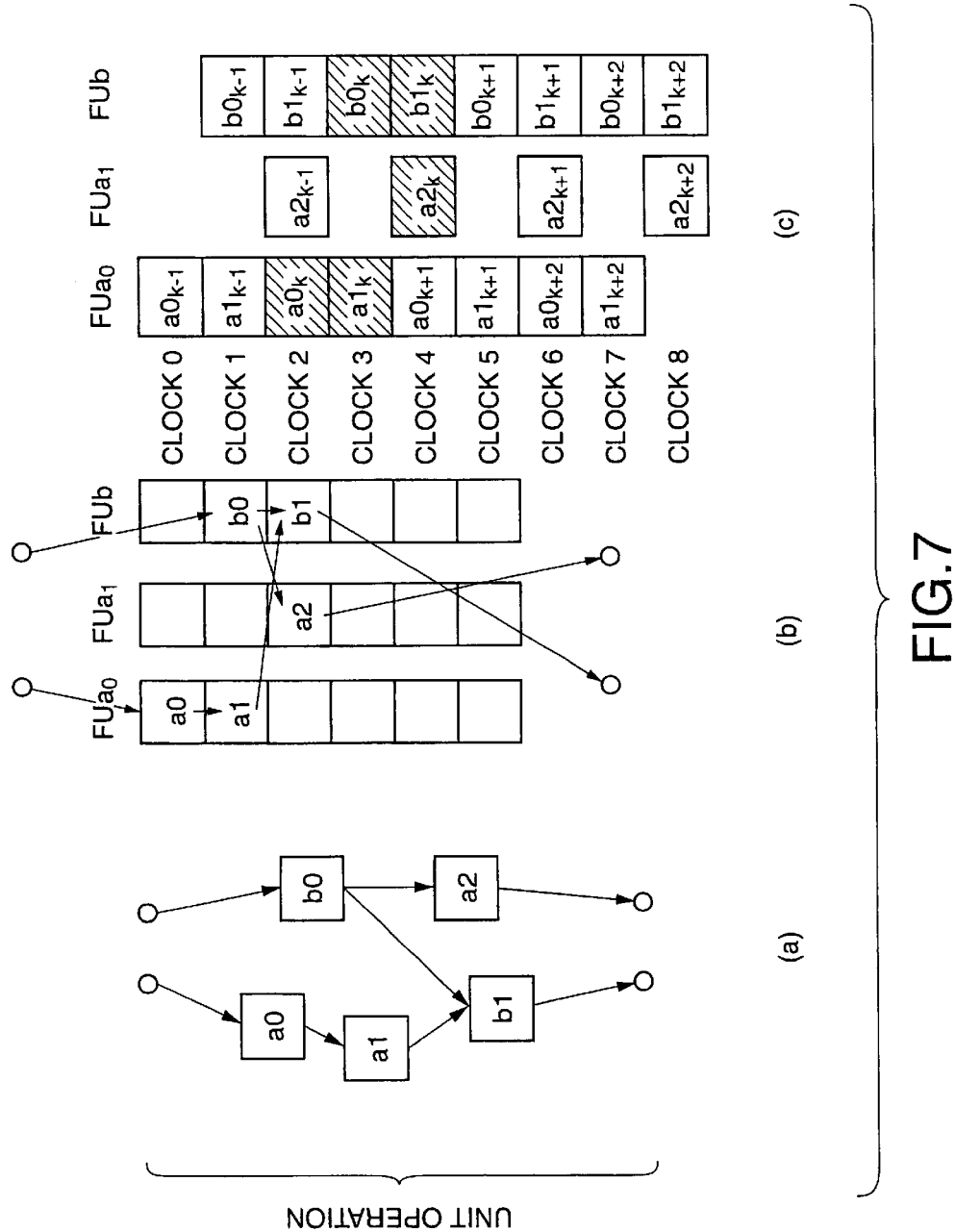
FIG. 7 is an illustration for explaining the operation of the image processing core in FIGS. 1 through 3, wherein (a) shows a data flow graph (DFG=unit operation), (b) shows a unit operation scheduled by three functional units (FUs), and (c) shows the schedule of three FUs.
Figure 8:
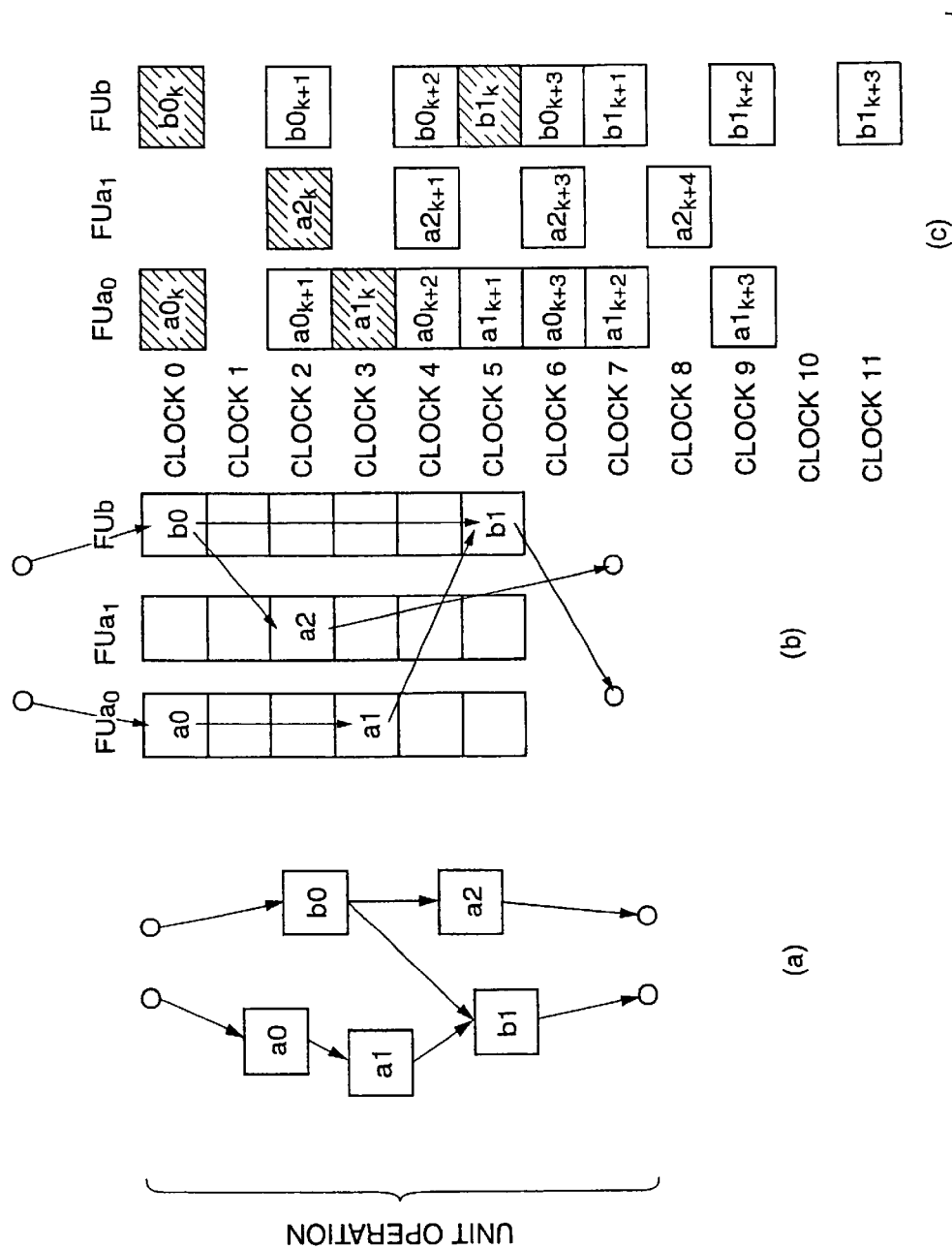
FIG. 8 is an illustration for explaining the operation of the image processing core in FIGS. 1 through 3, wherein (a) shows a data flow graph (DFG=unit operation), (b) shows a unit operation scheduled by three functional units (FUs), and (c) shows the schedule of three FUs, which are different from those in FIG. 5.

Furthermore, the programs executed by the image processor and their scheduling methods shown in FIGS. 4(a), 4(b) and 4(c) are examples. By providing three FUs in the operation pipeline, clocks being predetermined operation times may be two cycles to repeat operations. Such examples are shown in FIGS. 7 and 8. A unit operation shown in FIG. 7(a) is scheduled as shown in FIG. 7(b) to operate as shown in FIG. 7(c). There are three operation pipelines $FUa_0$, $FUa_1$ and FUb. The $FUa_0$ and $FUa_1$ carry out the same operation as that in FIG. 4 by substituting two pipelines for the function of the pipeline FUa in FIG. 4 and by repeating two clocks. Thus, the operations a0, a1 and a2 may be distributed in two operators $FUa_0$ and $FUa_1$.

If two operation pipelines are used for scheduling a unit operation as shown in FIGS. 4(b) and 4(c), six blocks from clock 0 to clock 5 are used for carrying out, e.g., the unit operation k. However, if three operation pipelines are used for scheduling a unit operation as shown in FIGS. 7(b) and 7(c), the same unit operation k can end by three clocks from clock 2 to clock 4, so that one unit operation can be completed by half cycles by adding only one operation pipeline.

FIGS. 8(a), 8(b) and 8(c) show a case where operations a0, a1 and a2 are distributed in two operators $FUa_0$ and $FUa_1$ similar to FIG. 7 and where operations a0 and a1 and operations b0 and b1 in the respective operation pipelines $FUa_0$ and FUb are spaced from each other by two clocks or more. Even if the number of the operation pipelines is increased by one to substitute two clocks for one clock in one of the operation pipelines, one unit operation may be completed by four clocks as shown in FIGS. 7(a), 7(b) and 7(c) or may be carried out by six clocks as shown in FIGS. 8(a), 8(b) and 8(c).

Furthermore, if operation is carried out as shown in FIG. 8, the operation b0 in the unit operation k+1 is executed prior to the operation b1 in the unit operation k. Thus, the operation in the unit operation to be subsequently executed can be executed prior to the operation in the unit operation to be executed before the operation to be subsequently executed. The feature of the example in FIG. 8 compared with that in FIG. 7 is that such scheduling can be carried out so that the sequence of operations is replaced.

Figure 9:
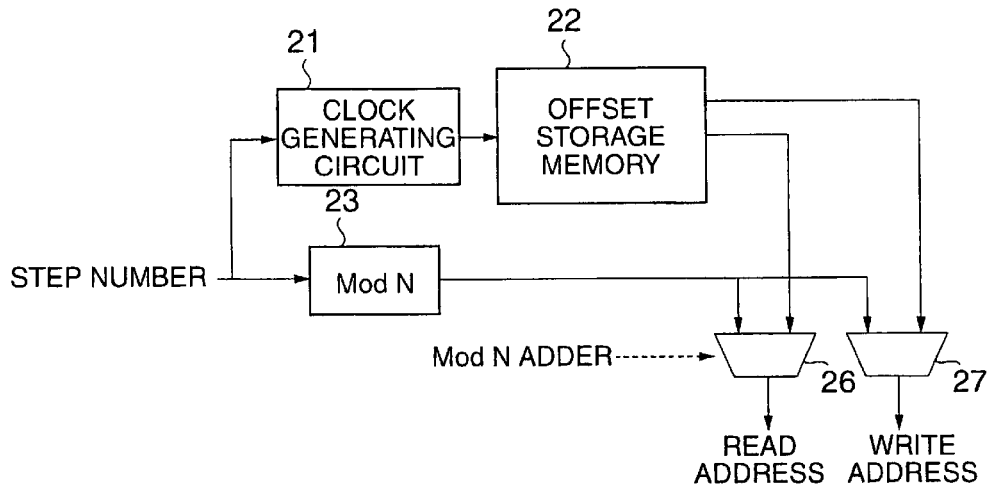
FIG. 9 is a block diagram showing the construction of an address generating circuit when a base address is equal to a "step number mod N"

The control of the switching channel 15 is carried out every channel (1 R/1W·RAM). Specifically, a read address and a write address are determined every channel. FIG. 9 shows the operation for determining the addresses in the channel. For example, the read and write addresses are determined as follows.

Assuming that N is the number of entries denoting the number of addresses in the memory, Base Address=(Generation Counted Value*Channel Multiplicity (Channel)) mod $N$ Read Address=(Base Address+Read Offset (Ch, phase)) mod $N$ Write Address=(Base Address+Write Offset (Ch, phase)) mod $N$ where the generator counter is a value counted up every clock 0. Since the base address is a value of modulo N, the base address can be realized every clock 0 by the counter (cycle counter) of the modulo N counted up every channel multiplicity. This will be hereinafter referred to as a base address counter.

The channel multiplicity is a value (natural number) indicative of the number of branches to be embedded in one channel, the branches indicating different data on a unit operation, and is determined every channel. The read and write offsets are determined every channel and every clock. Therefore, the control circuit every channel can be realized by a base counter and a circuit for reading read and write offsets every clock from a table to carry out a modulo addition to a value of a base address.

Figure 10:
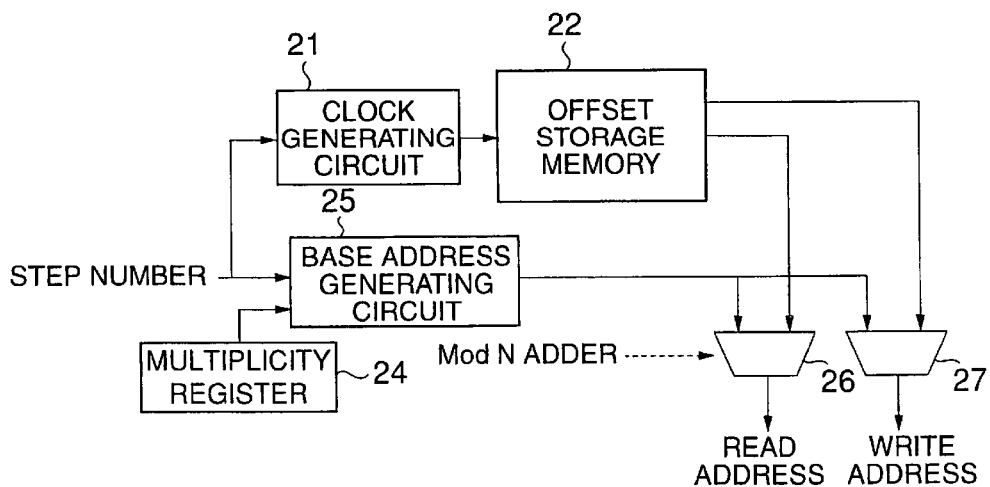
FIG. 10 is a block diagram showing the construction of an address generating circuit when a base address is equal to a "generation*base address step width mod N"

The block diagrams of FIGS. 9 and 10 show concrete examples of the controllers of FIGS. 1 through 3. FIG. 9 shows a functional construction of an address counter when a base address is equal to a step number mod N. In FIG. 9, a step number is inputted to a clock generating circuit 21 and a modulo N circuit 23, and a read address and a write address are outputted from adders 26 and 27 on the basis of an offset, which is read out of an offset storage memory 22, and an output of the modulo N circuit 23 on the basis of the output of the clock generating circuit 21.

FIG. 10 shows an example for obtaining a base address on the basis of a quotient which is obtained by dividing a step by the number of clocks when generation is determined. For example, when a graph is executed every two steps, one is counted up every two cycles. An offset is obtained in the same manner as that in the example of FIG. 8, and a base address is outputted from a base address generator 25 on the basis of the output of a multiplicity register 24 and the number of inputted steps. The base address is obtained by "Base Address=Generation*Base Address Step Width mod N", and the base address thus obtained is outputted to adders 26 and 27 in the same manner as that in FIG. 9.

The adders 26 and 27 add the offsets and base addresses, which are outputted from the offset storage memory 22, to output read addresses and write addresses, respectively. According to the address generating circuit in the example of FIG. 9, the base address step width can be a smaller value than the number of clocks, so that it is possible to more effectively use the memory than the base address generating circuit shown in FIG. 9.

Figure 11:
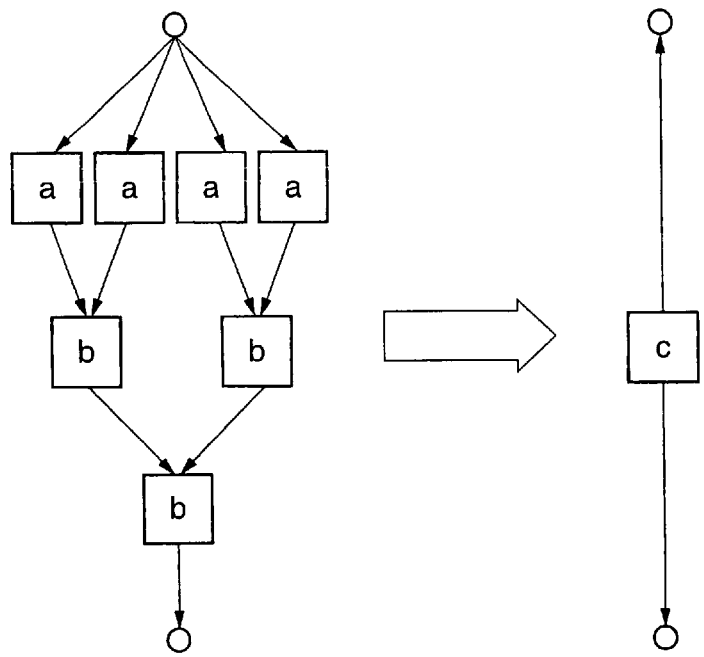
FIG. 11 is an illustration showing an example of the reduction of the number of branches in the case of a four-pixel blending processing serving as an example of an operation.

FIG. 11 shows an example of the reduction of the number of branches by increasing the function of an operator. FIG. 11 shows a case where a processing for blending four pixels in image data is carried out, wherein "a" means an operation for reading a pixel, and "b" means an operation for carrying out a pixel operation, "c" meaning an operation for reading four pixels to carry out a pixel operation. According to this example of operation, the number of branches on the left side of an outline arrow is eleven, whereas the number of branches on the right side thereof is two.

By thus increasing the function of the operator, it is possible to reduce the number of branches, and it is possible to decrease the scale of cross bar and channel. With such a construction, it can be applied to a circuit for reading a plurality of pixels with a filtering function which will be described later.

The image processing system according to the present invention may have the arrangement of a plurality of image processing cores. This is a construction wherein a plurality of image processing cores are arranged on one semiconductor chip, and can linearly improve performance by integrating a plurality of image processing cores. Since this has a scalability capable of executing a unit operation having a free scale to some extent by an image processing core alone, it is possible to execute a unit operation having a free scale to some extent even if the connection between the image processing cores is rough. Since the image processing core itself is a pipelined operator, an operator can be carried out in one throughput every cycle or every some cycles, so that the image processing core can be used as an operation pipeline for conventional image processors.

As described above, the image processing system according to the present invention use an concept that the flow of each operation processing in a unit operation is scheduled before execution of the operation. Although FIG. 4(a) shows the contents of the operation, the contents of the operation do not show the number of operation pipelines constituting the system. Therefore, the present invention does not depend on whether the number of operation pipelines capable of executing the operations a0, a1 and a2 is one or two. Each operation shown in FIG. 4(a) can be called a virtual operation pipeline.

By previously assigning a unit operation before scheduling as a program and by carrying out a detailed scheduling after the concrete configuration of the system is understood during execution, the program can be an independent construction from the system configuration. This is conceptually grasped to be the above described compiler serving as the second construction. Thus, even if the configuration of the system is changed, the same program can be executed specifically, it is possible to change the number of operation pipelines, the throughput of the operation pipelines, and latency, and so forth.

Although the connections between operation pipelines are limited in conventional image processors having a chaining function, the image processing system serving as the first basic construction according to the present invention can execute an optional DAG-like data flow program if the number of operation pipelines and the number of channels are allowed. Therefore, it is possible to reduce the number of loading/storing operations. In addition, since the operation pipeline can execute different instructions every clock, the number of vertexes constituting an executable DAG is not limited to the number of operation pipelines, so that it is possible to reduce the number of loading/storing operations in comparison with conventional image processors which do not have any virtual functions for operation pipelines.

Moreover, since the scheduling for operation pipelines is previously carried out every unit operation, it is possible to simplify the control circuit. A SIMD type processor can realize the same function by a software pipelining. However, if the function is realized by the SIMD type processor, a register file requires read ports, the number of which is equal to the total number of inputs of an operation unit, write ports, the number of which is equal to the total number of outputs of the operation unit, and registers, the number of which is (the number of channels×the mean depth of channels) or more. Therefore, it is required to provide a large scale of system, so that the proposed system is advantageous.

If the output path of the channel comprises a single-directional cross bar which is capable of carrying out a multicast and wherein a set of inputs do not overlap with a set of outputs, when a data flow program is executed, a plurality of channels for transferring the same data to the same step can be integrated to be replaced with one channel and a multicast in a channel output communication path. For that reason, it is possible to reduce the number of channels required to execute the same data flow program, and it is possible to decrease the scale of the system. The scale of the data flow graph (DFG=unit operation) capable of being realized by the same number of channels increases, so that it is possible to reduce the number of loading/storing operations.

If a channel constituting a group of channels comprise a random access memory and if the random access memory is formed so as to be capable of writing one data at an optional address every one step and reading one data from an optional address, when a data flow program is executed, a plurality of channels for transferring the same data to different steps, so that one channel can be substituted for the channel constituting the group of channels. Thus, the scale of the system can be reduced, and the number of loading/storing operations can be reduced.

Figure 12:
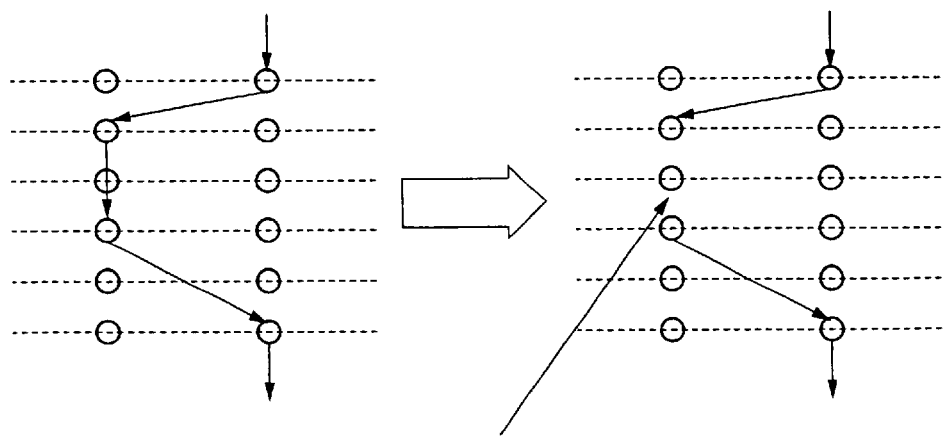

If the control circuit is formed so as to have the function of controlling to carry out the transfer between the same pipelines by a communication path provided in an operation pipeline, the number of used channels can be reduced, there are characteristic effects in that the scale of the system is reduced and the number of loading/storing operations is reduced. FIG. 12 shows an example of a channel capable of being reduced.

Figure 13:
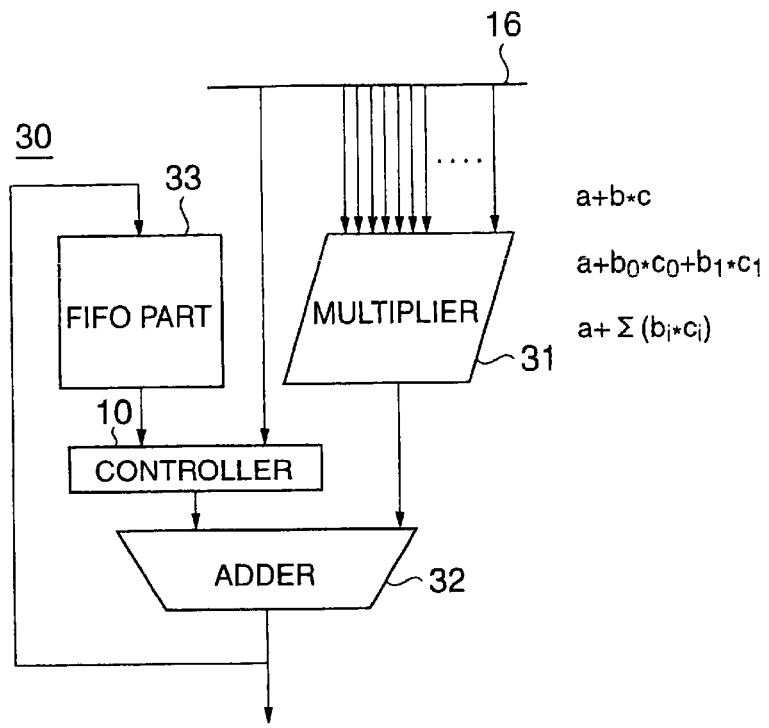
FIG. 13 is a block diagram showing an example of a pipeline for carrying out a multiplication and subtraction for concretely enabling the processing of FIG. 12.

By forming such a construction by a FIFO (First-In First-Out) circuit, the above described function can be realized by a simple system. In comparison with the above described construction, although conditions for reducing the number of used channels are slightly severe, the number of used channels can be efficiently reduced by scheduling instructions so as to be capable of reducing the channels during compile. FIG. 13 shows an example of an operation pipeline.

In FIG. 13, a FIFO circuit 30 comprises a multiplier 31 for multiplying image data supplied via, e.g., the internal bus 16 in FIGS. 2 and 3, an adder 32, one input of which is the output of the multiplier 31, a first-in first-out (FIFO) part 33 for receiving the output of the adder 32 to output in the input sequence by the first-in first out operation, and a controller 10 for synthesizing and outputting, e.g., address information inputted to the output of the FIFO part 33 via the internal bus 16. To the other input of the adder 32, the output of the controller 10 is fed.

This example is a pipeline for carrying out the MUL-ADD (a+b*c), and a channel is provided for returning the operation results to the input a. If the plurality of operation pipelines include an operation pipeline for carrying out an operation relating to color of an image, a complicated DAG often required for a graphic processor can be executed by a small number of loading/storing operations by using the proposed system for the graphic processor.

Figure 14:
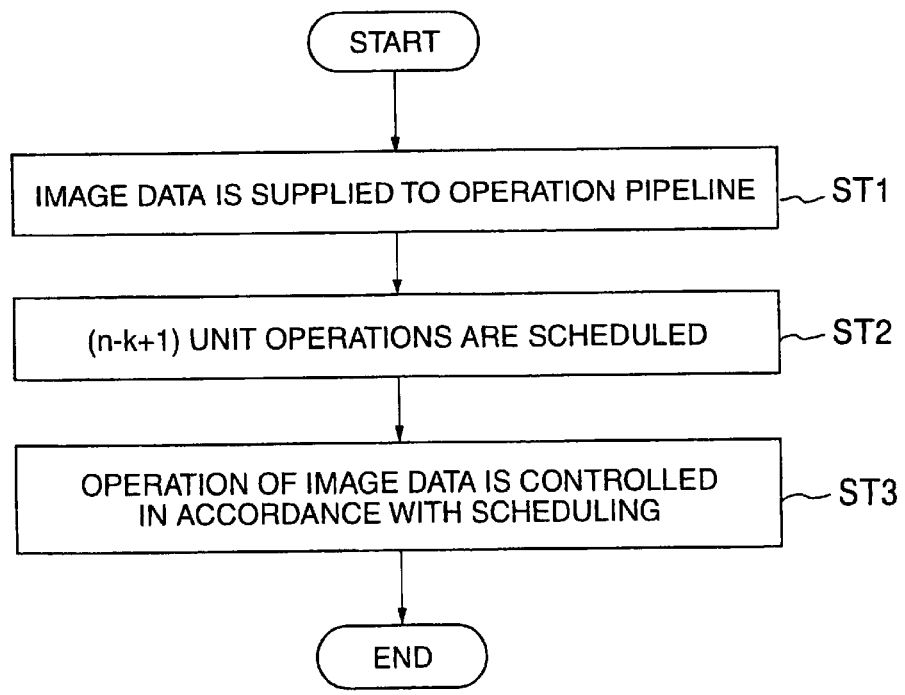
FIG. 14 is a flow chart showing processing steps of the third embodiment of an image processing method according to the present invention.

Finally, referring to the flow chart of FIG. 14, the third embodiment of an image processing method according to the present invention will be described below. In FIG. 14, at step ST1, at least part of image data supplied from the outside is fed to each operation pipeline constituting a plurality of pipelines for operating the inputted image data.

Then, at step ST2, (n−k+1) unit operations from a unit operation k to a unit operation n (n is a positive integer) of n unit operations from 1 to n, the unit operation comprising a plurality of operations, are scheduled so as not to overlap with each other at the same operation time in the same pipeline. A concrete example of this unit operation is shown in FIG. 4(a).

Then, as shown at step ST3 in FIG. 14, the operation of the image data is controlled in accordance with the scheduling carried out at step ST2. By the above described steps, the image data is processed.

As described above in detail, the present invention can provide an image processing system and method capable of reducing the number of paths in an image processing operation, the objects of which are various processes, to efficiently carry out the processes, and reducing the number of loading/storing operations in a memory, by processing data by an operating part for carrying out a parallel processing after previously scheduling data, which is read by one memory access and which is to be processed, when a large amount of data relating to the shape and color of an image is processed, and a compiler for use in this system. In addition, since the scheduling of operation pipelines is previously carried out every unit operation, the construction of the control circuit of the image processing system can be simplified.

What is claimed is:

1. An image processing system comprising:
   a plurality of operation pipelines to operate an inputted image data;
   a switching channel to switch a data transfer path to input operation results, which are outputted from the plurality of operation pipelines, to the plurality of operation pipeline again; and
   a control circuit to control switching of the data transfer path by the switching channel and to control an operation in the plurality of operation pipelines, the control circuit carrying out a scheduling of a plurality of operations, which form (n−k+1) unit operations from a unit operation k (1<k<n) to a unit operation n (n is a positive integer) of unit operations 1 to n, the plurality of operations prevented from overlapping with each other at the same predetermined operation time in the same operation pipeline when a unit operation included in the plurality of operations is executed by the plurality of operation pipelines.

2. An image processing system as set forth in claim 1, which further comprises:
   a memory unit to store the image data;
   a central processing unit (CPU) to carry out a predetermined information processing including an image processing;
   a bridge to which an input/output part of image data is connected and to which the memory unit is connected;
   a system bus to mediate the transmission and receiving of data to and from the CPU and the bridge; and
   a register to hold a part of the image data.

3. An image processing system as set forth in claim 1, wherein each of the plurality of pipelines, the switching channel and the control circuit are provided in an image processing core, and a plurality of image processing cores are provided, each of the plurality of image processing cores being the same as the image processing core, and
   each of the image processing cores further comprises a storing unit, a first loading unit, and a plurality of operation pipelines, each of which carries out a pixel operation.

4. An image processing system as set forth in claim 3, wherein each of the image processing cores comprises:
   an internal bus to supply an instruction from the outside of the core;
   the plurality of operation pipelines, to which the instruction supplied via the internal bus is assigned, to execute an operation every clock which is the predetermined operation time; and
   the switching channel including a cross bar and a group of channels to transmit an output of the operation pipelines every the clock to an optional channel of the channels and to transmit an output of an optional channel of the channels every clock to an input of an optional operation pipeline of the operation pipelines.

5. An image processing system as set forth in claim 1, wherein a data flow graph (DFG) serving as the unit operation comprises respective operations distributed in the plurality of operation pipelines, and the plurality of operation pipelines are controlled by the control circuit to schedule and process the respective operations forming a plurality of unit operations every clock.

6. An image processing system as set forth in claim 1, wherein the control circuit carries out a scheduling to prevent the respective operations forming the same unit operation from overlapping with each other in the same operation pipeline every clock being the same operation time, and carries out a scheduling to prevent respective operations from overlapping with each other even in adjacent unit operations and spaced unit operations, to control the processing of the plurality of operation pipeline.

7. An image processing system as set forth in claim 6, wherein the control circuit carries out one unit operation by using at least three operation pipelines, and controls the scheduling of the operation pipelines to process by a half clock cycle of that when two operation pipelines are used for operating.

8. An image processing system as set forth in claim 6, wherein the control circuit processes the unit operation using at least three operation pipelines, and controls the scheduling by replacing the sequence of operations to execute the respective operations in a unit operation k+1 prior to the respective operations in a unit operation k.

9. An image processing system as set forth in claim 1, wherein the control circuit comprises:
   a clock generating circuit to input the number of steps, which forms the basis for the generation of a clock serving as the predetermined operation time, to carry out a predetermined operation to generate the clock;
   an offset storage memory to store the clock, which is outputted from the clock generating circuit, as an offset;
   a modulo N circuit to input the number of steps to carry out a modulo addition;
   a first adder to add the offset, which is outputted from the offset memory, to an output of the modulo N circuit to generate a read address; and
   a second adder to add the offset to the output of the modulo N circuit to generate a write address.

10. An image processing system as set forth in claim 1, wherein the control circuit comprises:
   a clock generating circuit to input the number of steps, which forms the basis for the generation of a clock serving as the predetermined operation time, to carry out a predetermined operation to generate the clock;
   an offset storage memory to store the clock, which is outputted from the clock generating circuit, as an offset;
   a multiplicity register to store a multiplicity;
   a base address generating circuit to generate a base address to determine a generation on the basis of the number of steps and the multiplicity;

a first adder to add the offset to the base address to generate a read address; and a second adder to add the offset to the base address to generate a write address.

11. An image processing system as set forth in claim 1, wherein the control circuit has the function of enabling the transfer between the same pipelines in the plurality of operation pipelines by using a communication path provided in an operation pipeline, the communication path including a FIFO circuit comprising:

a multiplier to multiply inputted image data;

an adder, one input of which is an output of the multiplier;

a first-in first-out (FIFO) part to receive an output of the adder to output in the input sequence by a first-in first-out operation; and a controller to synthesize and process a signal including an address information in an output of the FIFO part to supply synthesized and processed signal to the other input of the adder.

12. A compiler for use in an image processing system having a plurality of operation pipelines to operate an inputted image data; a switching channel to switch a data transfer path to input operation results, which are outputted from the plurality of operation pipelines, to the plurality of operation pipeline again; and a control circuit to control switching of the data transfer path by the switching channel and to control an operation in the plurality of operation pipelines, the compiler comprising:

receiving a part of the image data supplied from the outside, by each operation pipeline included in the plurality of operation pipelines;

scheduling a plurality of operations, which form (n−k+1) unit operations from a unit operation k (1<k<n) to a unit operation n (n is a positive integer) of n unit operations from 1 to n included in the plurality of operations, the plurality of operations prevented from overlapping with each other at the same operation time in the same operation pipeline; and controlling a sequence of operations in the plurality operation pipelines in accordance with scheduling.

13. A compiler for use in an image processing system as set forth in claim 12, wherein the compiler carries out a scheduling to prevent the respective operations forming the same unit operation from overlapping with each other in the same operation pipeline every clock being the same operation time, and carries out a scheduling to prevent respective operations from overlapping with each other even in adjacent unit operations and spaced unit operations, to control the processing of the plurality of operation pipeline.

14. A compiler for use in an image processing system as set forth in claim 13, wherein the compiler carries out one unit operation by using at least three operation pipelines, and controls the scheduling of the operation pipelines to process by a half clock cycle of that when two operation pipelines are used for operating.

15. A compiler for use in an image processing system as set forth in claim 13, wherein the compiler processes the unit operation using at least three operation pipelines, and controls the scheduling by replacing the sequence of operations to execute the respective operations in a unit operation k+1 prior to the respective operations in a unit operation k.

16. An image processing method comprising:

supplying a part of inputted image data, which is supplied from the outside, to each operation pipeline forming a plurality of operation pipelines to operate the image data;

carrying out a scheduling of a plurality of operations, which form (n−k+1) unit operations from a unit operation k (1<k<n) to a unit operation n (n is a positive integer) of n unit operations from 1 to n forming the plurality of operations, the plurality of operations prevented from overlapping with each other at the same operation time in the same operation pipeline; and controlling the operation of the image data in accordance with scheduling.

17. An image processing method as set forth in claim 16, which further comprises storing at least a part of the inputted image data before carrying out the scheduling after at least the image data is inputted.

18. An image processing method as set forth in claim 16, which further comprises carrying out a scheduling of the respective operations forming the same unit operation to prevent the operation from overlapping with each other in the same operation pipeline every clock, which is the same operation time, during the scheduling, and carrying out a scheduling to prevent respective operations from overlapping with each other at the same clock even in adjacent unit operations and spaced unit operations, to control the processing of the plurality of operation pipelines.

19. An image processing method as set forth in claim 18, which further comprises carrying out one unit operation using at least three operation pipelines during the scheduling, and controlling the scheduling of the operation pipelines to process by a half clock cycle of that when two operation pipelines are used for operating.

20. An image processing method as set forth in claim 18, which further comprises processing the unit operation using at least three operation pipelines, and controlling the scheduling by replacing the sequence of operations to execute the respective operations in a unit operation k+1 prior to the respective operations in a unit operation k.

* * * * *

UNITED STATES PATENT AND TRADEMARK OFFICE
CERTIFICATE OF CORRECTION

PATENT NO. : 6,792,764 B2
DATED : September 21, 2004
INVENTOR(S) : Matthew E. Poese et al.

It is certified that error appears in the above-identified patent and that said Letters Patent is hereby corrected as shown below:

Column 6,
Line 28, "imoacoustic" should be changed to -- thermoacoustic --.

Column 16,
Line 46, "$L_{bel} = \delta/4$" should read -- $L_{bel} = \lambda/4$ --

Column 23,
Line 33, after the word "enclosure" insert -- disposed in the interior volume of a pressure vessel, the compliant enclosure --.
Line 60, "a pressure vessel, the compliant enclosure being disposed in the pressure vessel and" should be replaced with -- wherein --.

Column 24,
Line 22, after the word "enclosure" insert -- disposed in the interior volume of a pressure vessel, the compliant enclosure --.

Signed and Sealed this

Second Day of August, 2005

JON W. DUDAS
*Director of the United States Patent and Trademark Office*